US008626586B1

(12) United States Patent
Biere et al.

(10) Patent No.: US 8,626,586 B1
(45) Date of Patent: Jan. 7, 2014

(54) COORDINATED ADVERTISING FOR MULTIPLE WEARABLE ADVERTISING DISPLAY SYSTEMS

(75) Inventors: Devon Leon Biere, Olathe, KS (US); Michael Arthur Gailloux, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1007 days.

(21) Appl. No.: 11/426,217

(22) Filed: Jun. 23, 2006

(51) Int. Cl.
*G06Q 30/00* (2012.01)
*H04N 7/20* (2006.01)

(52) U.S. Cl.
USPC .............................. 705/14.49; 725/68; 725/71

(58) Field of Classification Search
USPC ............... 705/1–40; 707/1–30; 709/200–300; 725/68, 71
See application file for complete search history.

(56) References Cited

U.S. PATENT DOCUMENTS

| | | | |
|---|---|---|---|
| 5,912,653 | A | 6/1999 | Fitch |
| 5,929,777 | A | 7/1999 | Reynolds |
| 6,381,482 | B1 | 4/2002 | Jayaraman |
| 6,714,233 | B2 | 3/2004 | Chihara |
| 6,757,719 | B1 * | 6/2004 | Lightman et al. ............. 709/219 |
| 2002/0091843 | A1 | 7/2002 | Vaid |
| 2002/0095333 | A1 * | 7/2002 | Jokinen et al. .................. 705/14 |
| 2002/0156677 | A1 * | 10/2002 | Peters et al. .................... 705/14 |
| 2002/0197960 | A1 * | 12/2002 | Lee et al. ........................ 455/66 |
| 2004/0115430 | A1 | 6/2004 | Leonard |
| 2004/0192260 | A1 | 9/2004 | Sugimoto et al. |
| 2004/0192335 | A1 | 9/2004 | Wong et al. |
| 2005/0206616 | A1 | 9/2005 | Harary |
| 2005/0216346 | A1 | 9/2005 | Kusumoto et al. |
| 2006/0130100 | A1 * | 6/2006 | Pentland ......................... 725/68 |
| 2007/0027673 | A1 | 2/2007 | Moberg |
| 2007/0060118 | A1 | 3/2007 | Guyette |
| 2007/0124721 | A1 * | 5/2007 | Cowing et al. ................ 717/100 |
| 2007/0216600 | A1 | 9/2007 | Langlois |

OTHER PUBLICATIONS

Leander Kahney, Video Clothes: 'Brand' New Idea, Wired News, Jun. 7, 2000, www.wired.com/news/technology/1,36698-0.html, Lycos, Inc.
France Telecom develops flexible display clothing, gizmag, www.gizmag.com/go/3043.
Nyx clothing offers built-in flexible display screens, gizmag, www.gizmag.com/go/3409.
Clayton Collins, 'Billboards' that walk, talk, and even flirt a little, The Christian Science Monitor, Jul. 8, 2004, www.csmonitor.com/2004/0708/p11s01-wmgn.html.
Randell, Cliff and Muller, Henk. The Shopping Jacket: Wearable Computing for the Consumer:, Personal Technologies (2000).
Office Action dated: Apr. 2, 2009 from U.S. Appl. No. 11/406,959, filed Apr. 19, 2006.

(Continued)

*Primary Examiner* — Sun Li (57) ABSTRACT

Wearable advertising display systems that integrate wireless communications technologies with wearable, dynamic displays for advertising purposes. Advertising content may be dynamically selected and communicated to the wearable advertising display systems from a remote device. In some embodiments, multiple wearable advertising display system may work together to provide a coordinated advertising message. A determination may be made that multiple wearable advertising display systems are within proximity of each other. Coordinated advertising content may be selected. At least a portion of the coordinated advertising content is communicated to each of the wearable advertising display systems, which present the coordinated advertising content in conjunction.

11 Claims, 6 Drawing Sheets

(56) References Cited

OTHER PUBLICATIONS

Office Action dated: Oct. 15, 2008 from U.S. Appl. No. 11/406,959, filed Apr. 19, 2006.
Office Action dated: Jul. 9, 2009 from U.S. Appl. No. 11/426,228, filed Jun. 23, 2006.
Office Action dated: Jun. 16, 2009 from U.S. Appl. No. 11/426,229, filed Jun. 23, 2006.
Office Action dated: Jan. 21, 2009 from U.S. Appl. No. 11/426,229, filed Jun. 23, 2006.
Office Action dated: Oct. 29, 2008 from U.S. Appl. No. 11/426,185, filed Jun. 23, 2006.
Rick Merritt, Darpa Kick Starts Wearable Computer Initiative, website http://www.eetimes.conn/story/OEG20011101S0054, printed Feb. 16, 2006, 5 pages.
E.R. Post et al., E-Broidery: Design and Fabrication of Textile-Based Computing, IBM Systems Journal, 2000, pp. 840-860, vol. 39, Nos. 3&4.
When Style and Comfort are not Enough, Virginia Tech web article http://www.ecpe.vt.edu/news/ar04/hokie.html, Apr. 2004, 4 pages.
Carey Goldberg, Getting Wired Could Help Predict Emotions, The Boston Globe website http://www.boston.com/yourlife/health/mental/articles/2005/06/13/getting_wired_could_help_predict_emotions?mo . . . , Jun. 13, 2005, 3 pages.
D. Marculescu et al., Electronic Textiles: A Platform for Pervasive Computing, Proceedings of the IEEE, Dec. 2003, pp. 1993-2018, vol. 91, No. 12.
A New Way to Ride, SGMAG.com Gear website http://www.sgmag.com/hear/burton/, printed Feb. 16, 2006, 3 pages.
Office action from U.S. Appl. No. 11/406,959 dated Sep. 17, 2009, 19 pages.
Final Office Action from U.S. Appl. No. 11/426,228 dated Feb. 3, 2010, 23 pages.
Notice of Allowance from U.S. Appl. No. 11/426,229 dated Jan. 8, 2010, 11 pages.

* cited by examiner

COORDINATED ADVERTISING FOR MULTIPLE WEARABLE ADVERTISING DISPLAY SYSTEMS

CROSS-REFERENCE TO RELATED APPLICATIONS

This application is related by subject matter to the inventions disclosed in the commonly assigned applications U.S. application Ser. No. 11/426,185, filed on even date herewith, entitled "TRACKING ADVERTISING FOR WEARABLE ADVERTISING DISPLAY SYSTEMS," and U.S. application Ser. No. 11/426,228, filed on even date herewith, entitled "ADVERTISING CONTENT SELECTION AND ONLOOKER INTERACTION FOR WEARABLE ADVERTISING DISPLAY SYSTEMS," each of which is herein incorporated by reference in its entirety.

STATEMENT REGARDING FEDERALLY SPONSORED RESEARCH OR DEVELOPMENT

Not applicable.

TECHNICAL FIELD

This invention relates generally to wearable wireless displays systems for advertising.

BACKGROUND

Advertising is a significant component of marketing efforts used by companies to promote their goods and services. Advertisers spend billions of dollars each year on their advertising campaigns. Generally, a wide variety of advertising techniques and media have historically been used and are currently available to market products and services. For instance, advertising media may include billboards, human billboards, print media (e.g., newspapers, magazines, etc.), radio, and television advertising. Moreover, as technology continues to develop, new advertising opportunities are also continuously being created. For example, the advent of the Internet has given rise to Internet-based advertising, such as web banners. Despite the availability of a wide variety of different advertising techniques and media, product and service providers are always seeking novel ways to promote their products and services. The state of the art could be advanced if advertising could be provided via a wearable display system that may be dynamically updated via a wireless network interface.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed to wearable advertising display systems that integrate wireless communications technologies with wearable, dynamic displays for advertising purposes. In various embodiments, wearable displays may communicate via a wireless network to receive advertising content and allow for onlooker interaction with advertising content. In some embodiments, multiple displays may work in conjunction to provide coordinated advertising. Additionally, in some embodiments, advertising usage information may be tracked for billing advertising services provided by a wearable advertising display system Thus, in one aspect, an embodiment of the present invention relates to a method for presenting coordinated advertising content via two or more wearable advertising display systems. The method includes determining two or more wearable advertising display systems are located within proximity of each other. The method also includes selecting coordinated advertising content for the wearable advertising display systems. The method further includes communicating the coordinated advertising content to the wearable advertising display systems, wherein the coordinated advertising content is presented via the wearable advertising display systems.

In another aspect of the invention, an exemplary embodiment is directed to a method for presenting coordinated advertising content via two or more wearable advertising display systems. The method includes receiving coordinated advertising content at a first wearable advertising display system. The method also includes communicating at least a portion of the coordinated advertising content to one or more other wearable advertising display systems. The method further includes presenting the coordinated advertising content via the first wearable advertising display system and the other wearable advertising display systems.

A further aspect of the invention takes the form of a system for presenting coordinated advertising content via two or more wearable advertising display systems. The system includes an advertising server storing coordinated advertising content. The system also includes two or more wearable advertising display systems. At least one of the wearable advertising display systems is configured to communicate with the advertising server to receive at least a portion of the coordinated advertising content. The wearable advertising display systems are also configured to present the coordinated advertising content.

BRIEF DESCRIPTION OF THE SEVERAL VIEWS OF THE DRAWINGS

The present invention is described in detail below with reference to the attached drawing figures, which are incorporated by reference herein and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and or "block" may be used herein to connote different elements of methods employed, the terms should not be interpreted as implying any particular order among or between various steps herein disclosed unless and except when the order of individual steps is explicitly described.

It should be understood that arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Embodiments of the present invention provide wearable advertising display systems that integrate wireless communications technologies with wearable, dynamic displays for advertising purposes. In various embodiments, the systems allow wearable displays to communicate with a wireless network to receive advertising content, process and present the advertising content (visually and/or audibly), provide information for tracking activities performed via the wearable display system, and interact with other computing devices, including other wearable advertising display systems.

Embodiments of the present invention permit, among other things, a person's article of clothing (e.g., shirt, belt buckle, etc.) to function as an automatically changing, eye-catching billboard to promote brands and products. In some embodiments, wearers are paid or otherwise compensated via incentives to wear an intelligent display component as part of their attire. An advertising server may store a variety of advertising content from different advertisers. Advertising content may be selected for and communicated to a particular wearable advertising display system. The wearable advertising display system would receive the advertising content via a wireless network and present the advertising content. The wearable advertising display system may also provide data back to the network to aid in tracking, accountability, and billing for the advertising service performed by the wearer. In some embodiments, a wearable advertising display system could be interactive to allow onlookers to query or change the wearable display. In further embodiments, the system could be extended to allow multiple people to work together, with each of the wearable advertising display systems featuring a portion of a coordinated marketing display.

As one skilled in the art will appreciate, the present invention may be embodied as, among other things: a method, system, or computer-program product. Accordingly, the present invention may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Wearable Advertising Display System

Figure 1:
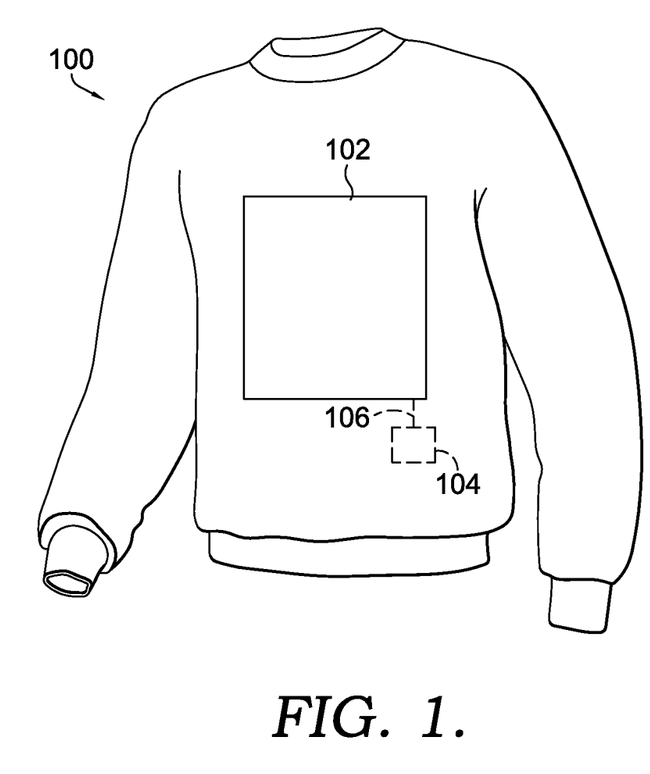
FIG. 1 is a perspective view of an exemplary wearable advertising display system in accordance with an embodiment of the present invention.

With initial reference to FIG. 1, a wearable advertising display system in accordance with an embodiment of the present invention is designated generally with the reference numeral 100. The wearable advertising display system 100 provides a system in which dynamic advertising may be presented on a wearable display and generally includes one or more of each of the following components: a display 102 and an interface device 104.

The display 102 may generally comprise any type of display device that may be worn by a user and is capable of presenting advertisements in accordance with embodiments of the present invention. In some embodiments, such as that shown in FIG. 1, the display 102 may be integrated with an article of clothing, such as a shirt or jacket. In other embodiments, the display may not be integrated with an article of clothing and may simply be worn on top of a user's clothing. Because the display 102 is worn by a user, the display is preferably light and compact. Accordingly, in an embodiment, the display 102 is a flat panel display (FPD), such as, for example, a liquid crystal display (LCD), an organic light emitting diode (OLED) display, a plasma display panel (PDP), or a light emitting diode (LED) display. In some embodiments, the display 102 may include one or more speakers for presenting audio content.

The wearable display system also includes an interface device 104 in communication with the display 102 via a wired or wireless communication link 106. The interface device 104 generally facilitates presentation of advertisements via the display 102. In particular, the interface device 104 provides long-range wireless capabilities to the wearable advertising display system 100, for example, by transmitting and receiving radio frequency (RF) signals to and from a wireless network. Accordingly, the interface device 104 may receive advertisements from a network component for presentation via the display 102. In some embodiments, the interface device 104 may track advertising usage information, such as, for instance, advertising content displayed, time and location that advertising content is displayed, and onlookers' interactions with advertising content. In further embodiments, the interface device 104 may facilitate onlookers' interactions with advertising content presented on the display.

Figure 2:
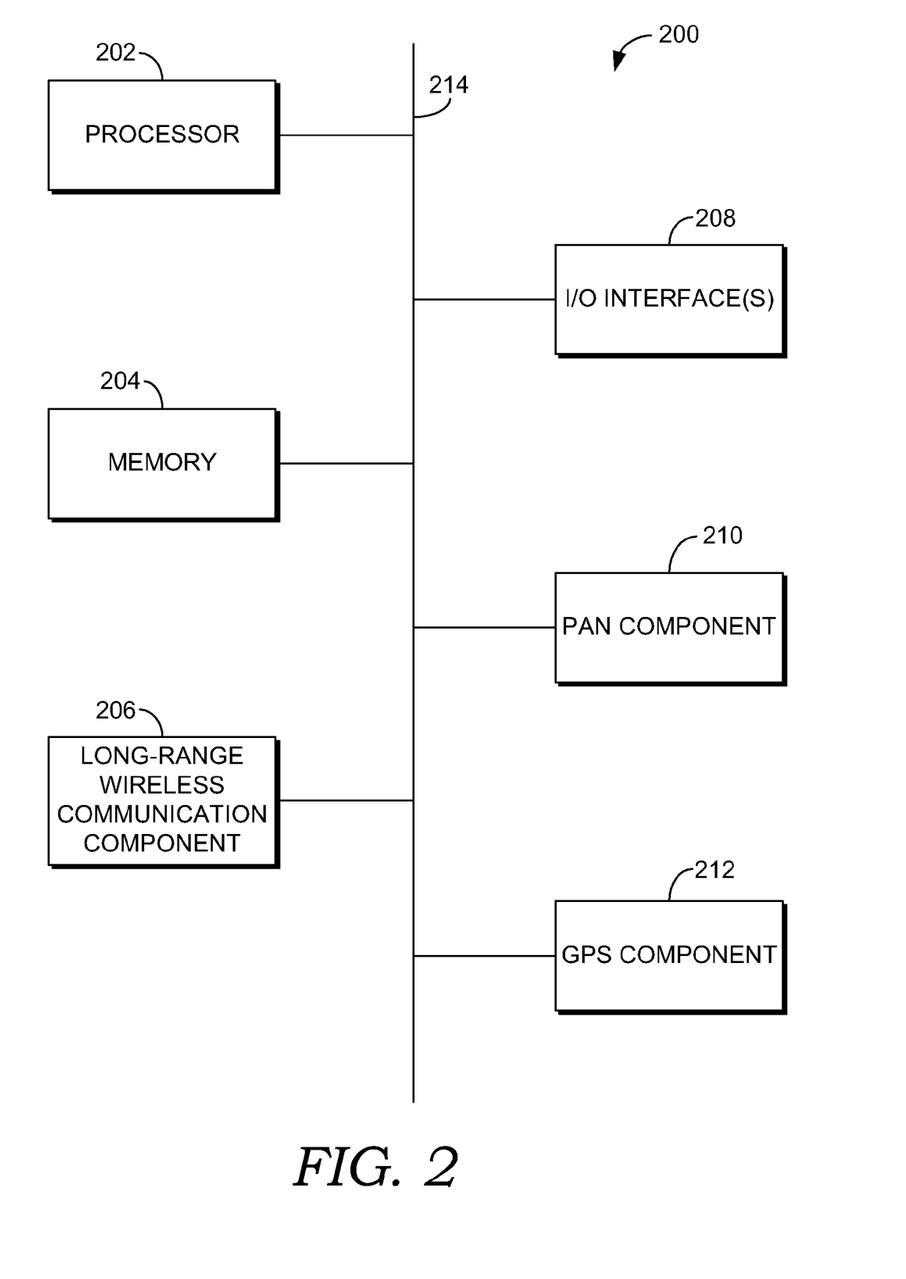
FIG. 2 is a block diagram of an exemplary interface device in accordance with an embodiment of the present invention.

A block diagram of an exemplary interface device 200 is shown in FIG. 2. Among other components not shown, the exemplary interface device 200 generally includes a processor 202, memory 204, a long-range wireless communications component 206, input/output interface(s) 208, a personal area network (PAN) component 210, and a global positioning system (GPS) component 212, all of which may be communicatively linked by a system bus 214. Additionally, the interface device 200 may include a power source (e.g., a battery) or cabling to connect the unit to a power source. Depending on the complexity of the wearable advertising display system, the interface device 200 may include only a portion of the components shown in FIG. 2 and/or may include additional components not shown.

The processor 202 may comprise one or more processors that read data from various components and operate to coordinate various functions of the interface device 200 as described herein. The memory 204 includes computer-storage media in the form of volatile and/or nonvolatile memory. The memory 204 may be removable, nonremovable, or a combination thereof. The memory 204 serves to store data, such as program instructions and personal information. In some embodiments, the memory 204 may store advertising content communicated to the wearable advertising display system for presentation via a display. In further embodiments, the memory 204 may store tracked advertising usage information.

The long-range wireless communications component 206 functions to establish and engage in communication over a long-range wireless RF interface. In embodiments, the long-range wireless communications component may both transmit and receive RF signals over the long-range wireless RF interface. The communication may occur in a digital format, such as CDMA, TDMA, GSM, or may occur in an analog format, such as AMPS.

The input/output interface(s) 208 may comprise one or more interfaces with various input and output devices that may be included within a wearable advertising display system. For instance, an output interface may be provided for communicating advertising content to a display. In embodiments in which separate speakers are provided as a part of the wearable advertising display system, an output interface may be provided for communicating audio content to the speakers. In some embodiments, onlookers may be able to interact with advertising content via one or more input devices, such as a keyboard or key pad. Accordingly, one or more input interfaces may be provided for such input devices.

In some embodiments, such as that shown in FIG. 2, the interface device 200 may also include a PAN component 210. The PAN component 210 provides short-range wireless communications between the interface device 200 and other devices and components. For instance, in some embodiments, the PAN component 210 may provide a wireless link between the interface device 200 and output devices, such as a display and/or speakers. In some embodiments, the PAN component 210 may provide a wireless link between the interface device 200 and one or more input devices. Further, in some embodiments, the PAN component may be used to track onlookers in the vicinity of the wearable advertising display system by detecting the onlookers' devices (e.g., cell phones) with the PAN. The PAN component 210 may communicate via Bluetooth or other standards for short-range wireless communications.

The interface device 200 may also include a GPS component 212 in some embodiments of the invention. The GPS component 212 may be used to determine a location of the wearable advertising display system. Location information collected by the GPS component 212 may be used in a variety of different manners in various embodiments of the present invention. For instance, location information may be used to provide location-based advertising. Additionally, location information may be used as advertising usage information, by providing information regarding where specific advertising content was displayed.

In some embodiments, the interface device 200 may comprise a component that is specifically dedicated to and integrated with a wearable advertising display system. For instance, in an embodiment, the interface device 200 may integrated with the article of clothing and an e-textile may provide communication between the interface device 200 and a display that is also integrated with the article of clothing. In other embodiments, a user's personal device, such as a user's cell phone, may operate as the interface device 200. In such embodiments, a physical connection may be provided in the wearable advertising display system for providing communication between the user device and a display and/or the user device may communicate with the display via a wireless personal area network (e.g., via Bluetooth).

Figure 3:
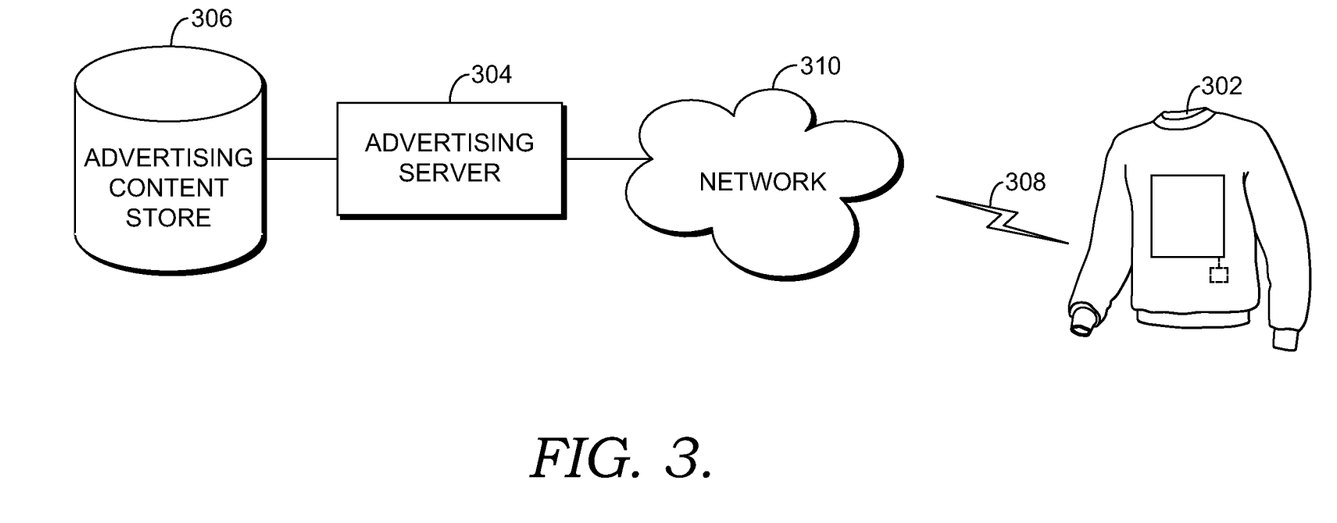
FIG. 3 is a block diagram of an exemplary system architecture suitable for use in implementing an embodiment of the present invention.

Referring now to FIG. 3, a block diagram is shown of an exemplary system 300 in which exemplary embodiments of the present invention may be employed. The system 300 may include, among other components not shown, a wearable advertising display system 302, an advertising server 304, and an advertising content store 306. The wearable advertising display system 302 may be similar to the wearable advertising display system 100 described with reference to FIG. 1. The wearable advertising display system 302 may communicate with the advertising sever 304 via a long-range wireless RF interface 308 to a network 310. The network 310 may include one or more wide area networks (WANs) and/or one or more local area networks (LANs), as well as one or more public networks, such as the Internet, and/or one or more private networks.

The advertising server 304 may perform a variety of functions in accordance with various embodiments of the present invention. It will be understood by one skilled in the art that one or many network components may provide the functions of the advertising server 304 as described herein. The advertising server 304 generally provides advertising content to wearable advertising display systems, such as the wearable advertising display system 302. The advertising content may be stored in an associated advertising content store 306. The advertising content may comprise any combination of media content, including still images, text, video, and audio content.

In some embodiments, the advertising server 302 may stream advertising content to the wearable advertising display system 302, which may present the streaming advertising content. In other embodiments, the advertising server 304 may communicate advertising content to the wearable advertising display system 302, which may store the advertising content for later presentation.

The advertising content store 306 may store a variety of advertising content from one or more advertisers. Advertising content to be presented by a particular wearable advertising display system may be selected in a number of different manners within various embodiments of the present invention (as will be described in further detail below). For instance, in some embodiments, the advertising content may be randomly selected for the wearable advertising display system 302. In other embodiments, advertising content may be manually selected for the wearable advertising display system 302. In further embodiments, advertising content may be selected based on the current location of the wearable advertising display system 302. In such embodiments, the advertising server 304 may determine the location of the wearable advertising display system 302 and select particular advertisements based on the location. In further embodiments, advertising content may be selected based on profiles and/or preferences associated with the wearer of the wearable advertising display system 302.

In some embodiments, multiple advertising display systems, including the wearable advertising display system 302 and one or more other wearable advertising display systems, may work together to provide coordinated advertising. In such embodiments, the advertising content store 306 may store coordinated advertising content and the advertising server 304 may facilitate the coordinated advertising message. For instance, the advertising server 304 may determine that multiple advertising display systems are within proximity of each other or otherwise situated for providing coordinated advertising. Accordingly, the advertising server 304 may select and communicate coordinated advertising content for presentation via the multiple wearable advertising systems.

The advertising server 304 may also track advertising usage information for wearable advertising display systems, such as the wearable advertising display system 302, for accountability and billing purposes. As will be described in further detail below, in various embodiments of the present invention, advertising usage information may include network-based advertising usage information and/or advertising usage information tracked by the wearable advertising display system 302.

Advertising Content Selection for Wearable Advertising Display System

As discussed previously, one or more advertising content stores and advertising servers, such as the advertising content store 306 and advertising server 304 of FIG. 3, may store a variety of advertising content from different advertisers and provide advertising content to wearable advertising display systems. In various embodiments of the present invention, advertising content may be selected for a particular wearable advertising display system in a variety of different ways. For example, in some embodiments, advertising content may be randomly selected and communicated from an advertising server to a wearable advertising display system. In other embodiments, a user may be allowed to manually select advertising content for display on the user's wearable advertising display system. For instance, the user may be able to access a list of advertising content stored on an advertising server and available to the user. The user may then select advertising content from the list. In further embodiments, advertising content may be selected based on the location of a wearable advertising display system. In still further embodiments, advertising content may be selected based on a user profile associated with a wearable advertising display system. Any and all such variations are contemplated within the scope of embodiments of the present invention.

Figure 4:
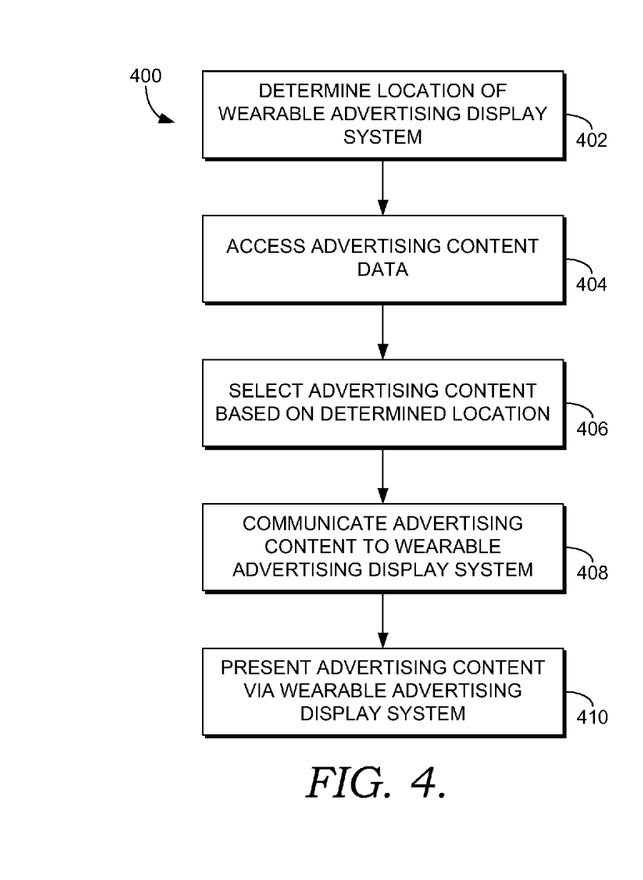
FIG. 4 is a flow diagram showing an exemplary method for selecting advertising content based on the location of a wearable advertising display system in accordance with an embodiment of the present invention.

Turning to FIG. 4, a flow diagram is provided illustrating a method 400 for selecting advertising content based on the location of a wearable advertising display system in accordance with an embodiment of the present invention. Advertisers typically wish to target advertisements to potential customers as opposed to the general public. Accordingly, location-based advertising is one way through which targeted advertising may be provided. Initially, as shown at block 402, the location of a wearable advertising display system is determined. One skilled in the art will recognize that the wearable advertising display system's location may be determined by any of a variety of different methods for locating a wireless device. For example, in some embodiments, the general location of a wearable advertising display system may be determined by identifying a cell tower with which the wearable advertising display system is communicating. In other embodiments, multiple cell towers may be used to triangulate a wearable advertising display system's position. In further embodiments, the wearable advertising display system may have GPS capability, which may provide a more specific location of the wearable advertising display system. In such embodiments, the wearable advertising display system may determine its location and communicate location information to an advertising server or another network server accessible by an advertising server.

After determining the location of the wearable advertising display system, advertising content data may be accessed, as shown at block 306, for example, by accessing an advertising content store, such as the advertising content store 306 of FIG. 3. The advertising content data may include information associating advertising content with location information. Advertising content may be associated with location information of varying scale within embodiments of the present invention. By way of example only and not limitation, advertising content may be associated with a region of the country, a county, a city, a shopping area, and/or a specific business, such as a store or restaurant.

Using the determined location of the wearable advertising display system, advertising content is selected, as shown at block 406. The selected advertising content is communicated to the wearable advertising display system, as shown at block 408. The advertising content is then presented via the wearable advertising display system, as shown at block 410. In some embodiments, advertising content may be streamed to the wearable advertising display system, which presents the advertising content as it is streamed. In other embodiments, advertising content may be communicated to the wearable advertising display system, which stores the advertising content for subsequent presentation.

As indicated above, in some embodiments, advertising content may be selected based on a user profile associated with a wearable advertising display system. The user profile may contain a variety of information regarding characteristics and preferences of the user. User characteristics include information such as, for example, age, ethnicity, weight, hair color, eye color, and clothing style. One skilled in the art will recognize that a wide variety of user characteristics may be employed within various embodiments of the present invention. User preferences relate to the type of advertising content the user wishes to receive and present via the user's wearable advertising display system.

By employing a user profile, advertising content may be selected for presentation via a wearable advertising display system based on the user's characteristics and/or preferences. Among other things, this provides another form of targeted advertising. By way of example, an advertiser's target market may be a particular age range. Accordingly, advertising content associated with the advertiser may be selected for user profiles indicating users within that age range.

Figure 5:
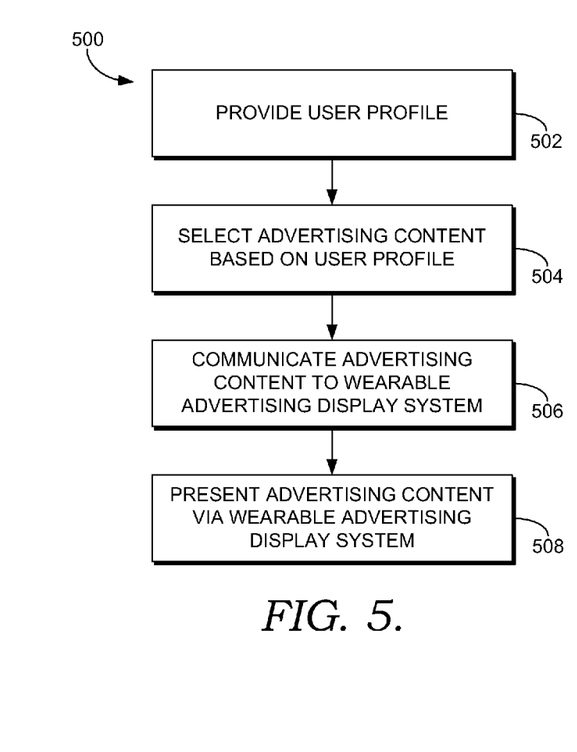
FIG. 5 is a flow diagram showing an exemplary method for selecting advertising content based on a user profile associated with a wearable advertising display system in accordance with an embodiment of the present invention.

Referring now to FIG. 5, a flow diagram is provided showing an exemplary method 500 for selecting advertising content based on a user profile in accordance with an embodiment of the present invention. As shown at block 502, a user profile is provided that includes user characteristics and/or user preferences of a user associated with a wearable advertising display system.

Based on the user profile, advertising content is selected, as shown at block 504. The selection of advertising content based on a user profile may be performed in a variety of different manners within the scope of the present invention. For example, in one embodiment, an advertising content data may be accessed, for example, by accessing an advertising content store, such as the advertising content store 306 of FIG. 3. The advertising content data may include information associating advertising content with information such as target user characteristics and/or advertising content type to facilitate the automatic selection of advertising content based on user profiles. Advertising content may be selected by comparing the user profile information against this advertising content data. For instance, user characteristics in the user profile may be compared against target user characteristics to select appropriate advertising content. Additionally, user preferences in the user profile may be compared against the advertising content type for advertising content selection.

The selected advertising content is communicated to the wearable advertising display system, as shown at block 506. The advertising content is then presented via the wearable advertising display system, as shown at block 508. As indicated hereinabove, in some embodiments, advertising content may be streamed to the wearable advertising display system, which presents the advertising content as it is streamed. In other embodiments, advertising content may be communicated to the wearable advertising display system, which stores the advertising content for subsequent presentation.

Onlooker Interaction with Advertising Content

In some embodiments, onlookers may be able to interact with advertising content after it has been received and presented on wearable advertising display systems. In some cases, a wearable advertising display system may have one or more associated input devices allowing onlookers to interact with the system. For instance, a wearable advertising display system may include a microphone, allowing onlookers to interact with the system via voice. As another example, the display device of the wearable advertising display system may be a touch screen, allowing onlookers to interface with the system via touch. As a further example, other types of inputs devices, such as keypads and keyboards, for instance, may also be associated (wired or wireless) with the wearable advertising display system to facilitate onlooker interaction. In other cases, onlookers may user their own devices to interact with a wearable advertising display system. For instance, onlookers may be able to interact with a wearable advertising display system using a cell phone to communicate with the system via a personal area network (e.g., via Bluetooth).

By interacting with a wearable advertising display system, an onlooker may be able to change the content presented on the wearable advertising display system. In particular, onlooker interface may cause the wearable advertising display system to access and present further content associated with an advertisement or an associated advertiser's business, product, and/or service. For example, an onlooker may interact with an advertisement presented on a wearable advertising display system to access location information for a store (e.g., nearest store location, directions, etc.) or to view specials. In some embodiments, onlooker interaction may allow content to be sent to an onlooker's device. For instance, coupons could be pushed to an onlooker's cell phone.

Figure 6:
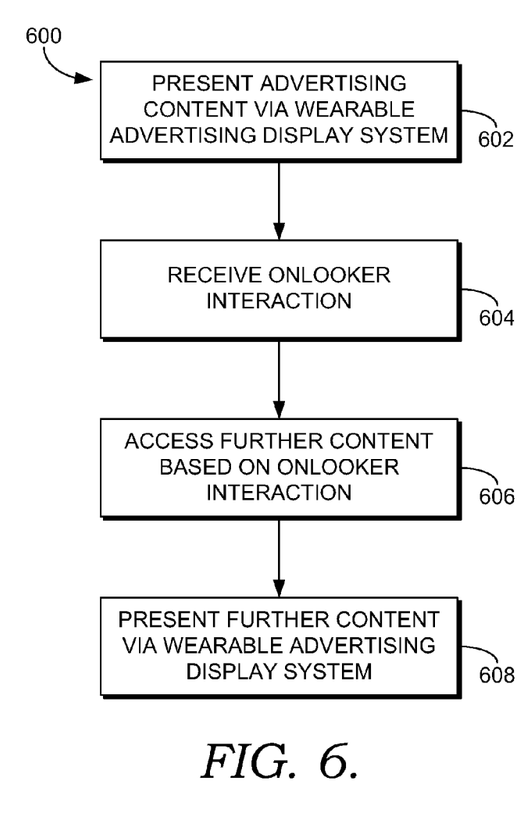
FIG. 6 is a flow diagram showing an exemplary method for facilitating onlooker interaction with a wearable advertising display system in accordance with an embodiment of the present invention.

Turning to FIG. 6, a flow diagram is provided illustrating an exemplary method 600 for facilitating onlooker interaction with a wearable advertising display system in accordance with an embodiment of the present invention. As shown at block 602, advertising content is presented via a wearable advertising display system. The advertising content may have been selected and communicated to the wearable advertising display system from an advertising server as discussed hereinabove. The advertising content may include content that entices an onlooker to interact with the wearable advertising display system.

As shown at block 604, the wearable advertising display system receives onlooker interaction. The onlooker interaction with the wearable advertising display system may be via one or more input devices associated with the wearable advertising display system (e.g., microphone, touch screen, keypad, or keyboard) or may be via a device associated with an onlooker (e.g., the onlooker's cell phone).

In response to the onlooker interaction, the wearable advertising display system communicates with a network component to access further content, as shown at block 606. As discussed previously, the wearable advertising display system may be provided network access over a wireless communication interface. In some embodiments, the network component may be an advertising server, such as the advertising server 304 of FIG. 3, and the further content may be associated with the advertising content within the advertising server. In other embodiments, the network component may be unassociated with advertising server. For example, the network component could be an advertiser's server. The content accessed from the network component is received and presented by the wearable advertising display system, as shown at block 608. As indicated above, in some embodiments, further content may be alternatively or additionally communicated to an onlooker's device, such as an onlooker's cell phone.

Coordinated Advertising for Multiple Wearable Advertising Display Systems

In further embodiments of the present invention, multiple displays and/or multiple wearable advertising display systems may be configured to provide a coordinated advertising message. In some embodiments, a user may wear multiple displays that are coordinated to provide a common advertising presentation. In other embodiments, multiple people may work together with each of their wearable advertising display systems featuring a portion of a coordinated marketing display. For example, a coordinated advertisement may comprise text, such as a billboard message. Each of the wearable advertising display systems may present a portion of the text such that the entire message is presented via the multiple systems. As another example, a coordinated advertisement may comprise a video, wherein each of the multiple wearable advertising display systems may present a portion of the video. This may allow, for example, objects within the video to appear to move from one display to another. Additionally, interactive advertising may be provided via multiple wearable advertising display systems. For instance, an advertiser's interactive advertisement may comprise a virtual slot machine, in which each of the wearable advertising display systems provide a symbol and onlookers may attempt to get a combination of symbols via the multiple advertising display systems.

Figure 7:
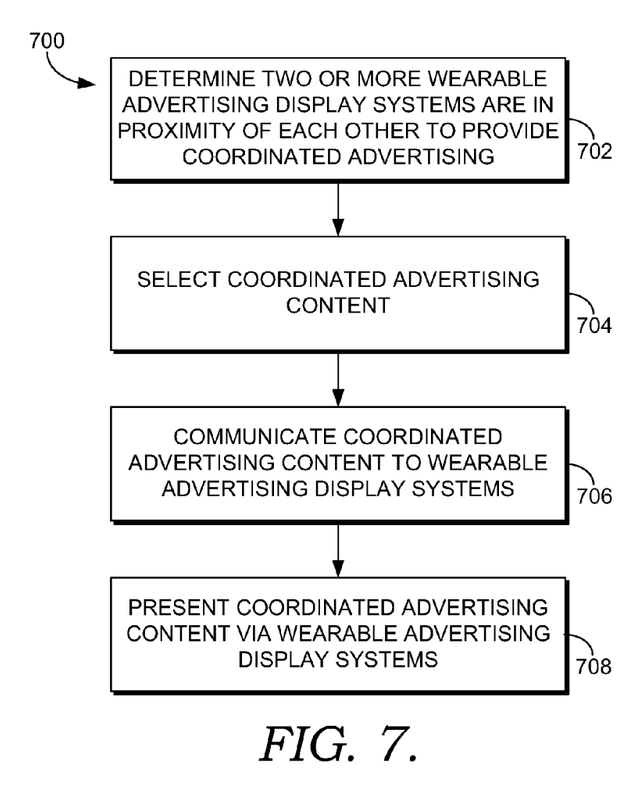
FIG. 7 is a flow diagram showing an exemplary method for providing coordinated advertising content via multiple wearable advertising display systems in accordance with an embodiment of the present invention.

Referring to FIG. 7, a flow diagram is provided illustrating an exemplary method 700 for presenting coordinated advertising content via two or more wearable advertising display systems in accordance with an embodiment of the present invention. As shown at block 702, a determination is made that two or more wearable advertising display systems are located within a proximity of each other suitable for coordinated advertising. For instance, in some embodiments, each of the wearable advertising display systems may have GPS capability for providing location information. Accordingly, a network component may recognize that the wearable advertising display systems are within a proximity of each other based on the location information. In other embodiments, the wearable advertising display systems may recognize the presence of each other, for example, via a wireless personal area network (e.g., via Bluetooth). One or more of the wearable advertising display systems may then communicated with a network component, indicating that the wearable advertising display systems are within a proximity of each other for coordinated advertising. In further embodiments, a manual indication may be provided to indicate that multiple wearable advertising display systems are situated as to provide coordinated advertising.

Coordinated advertising content is selected, as shown at block 704. The coordinated advertising content may be selected in a variety of different manners, including those discussed hereinabove, such as random selection, manual selection, location-based selection, and/or profile-based selection. Additionally, in some embodiments, the coordinated advertising content selection may be based on the number of wearable advertising display systems that will be presenting the coordinated advertising.

The selected coordinated advertising content is communicated to the wearable advertising display systems, as shown at block 706. This may be performed in a variety of different manners with the scope of the present invention. For instance, in one embodiment, a network component, such as the advertising server 304 of FIG. 3, communicates a portion of the coordinated adverting content to each of the wearable advertising display systems. In another embodiment, the network component may communicate the coordinated advertising content to one of the wearable advertising display systems, which may in turn communicate portions of the coordinated advertising content to the other wearable advertising display systems (e.g., via a wireless personal area network). Finally, the coordinated advertising content is presented via the wearable advertising display systems, as shown at block 708.

One skilled in the art will recognize that the communication of coordinated advertising content to multiple wearable advertising display systems and presentation of the coordinated advertising content may be performed in a variety of manners other than described hereinabove. For instance, in some embodiments, coordinated advertising content may be communicated to one or more of the wearable advertising display systems prior to the wearable advertising display systems being in proximity of each other. In such embodiments, the one or more wearable advertising display systems may store the coordinated advertising content until the wearable advertising display systems are in proximity of each other and present the coordinated advertising content at that time.

Tracking and Accounting of Advertising for a Wearable Advertising Display System Users may be paid or otherwise compensated to wear advertising display systems in accordance with embodiments of the present invention. Accordingly, advertisers and/or providers of advertising services may wish to track aspects of advertising content usage by individual wearable advertising display systems in embodiments of the present invention. By tracking information associated with advertising content usage for a wearable advertising display system, the information may be used for accountability and billing for advertising services provided by the wearer. A variety of advertising content usage information may be tracked. By way of example only and not limitation, the advertising content usage information tracked for a wearable advertisement display system may include information regarding: the on/of status of the display; what advertising content was communicated to the wearable advertising display system; what advertising content was presented; when advertising content was presented; where advertising content was presented; the presence of onlookers within the vicinity of the wearable advertising display system; onlooker interactions with advertising content; whether the wearable advertising display system was worn during presentation of advertising content; and whether the display was covered during presentation of advertising content.

In an embodiment, a network device, such as the advertising server 304 of FIG. 3, may be used to track and/or store advertising content usage information for billing advertising services associated with a wearable advertising display system. In some embodiments, advertising usage information may be tracked by the wearable advertising display system and communicated to the network component (e.g., as described below with reference to FIG. 8). In other embodiments, advertising usage information may be primarily tracked by the network component, which may access a variety of network-based advertising usage information (e.g., as described below with reference to FIG. 9). In further embodiments, the network component may store both advertising usage information received from the wearable advertising display system and network-based advertising usage information. Any and all such variations are contemplated within the scope of embodiments of the present invention.

Figure 8:
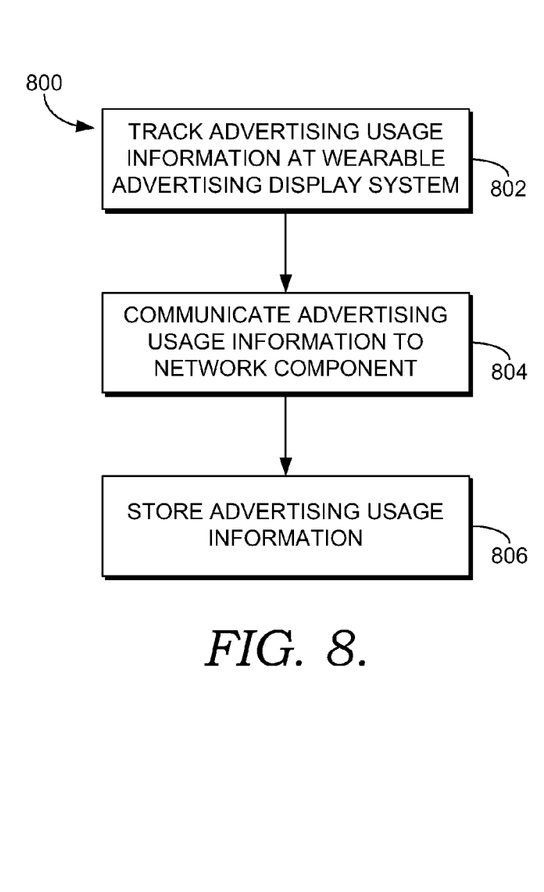
FIG. 8 is a flow diagram showing an exemplary method for tracking advertising usage information for billing advertising services provided by a wearable advertising display system in accordance with an embodiment of the present invention.

Referring to FIG. 8, a flow diagram is illustrated showing an exemplary method 800 for tracking adverting usage information at a wearable advertising display system for billing advertising services provided by the wearable advertising display system in accordance with an embodiment of the present invention. In the present exemplary embodiment, advertising usage information is tracked by the wearable advertising display system and communicated to a network component (e.g., the advertising server 304 of FIG. 3). As shown at block 802, the wearable advertising display system tracks advertising usage information. For instance, the wearable advertising display system may track what advertising content was received from, for example, an advertising server. When wearable advertising display system presents advertising content, it may track what advertising content was presented and when the advertising content was presented. In some embodiments, the wearable advertising display system may also determine the location where advertising content was presented (e.g., using a GPS component).

In some embodiments, the wearable advertising display system may also be able to track the presence of onlookers within proximity of the wearable advertising display system while advertising content is being displayed. For instance, the wearable advertising display system may be able to detect the presence of onlooker devices (e.g., an onlooker's mobile phone) within the wireless personal area network of the wearable advertising display system. As another example, the wearable advertising display system may be able to detect the presence of onlookers by incorporating a device, such as a heat sensing device or a motion sensing device, capable of detecting the presence of an onlooker within proximity of the device.

In further embodiments, the wearable advertising display system may also be able to track onlooker interaction with the wearable advertising display system. For instance, the wearable advertising display system may track information regarding onlooker interaction via an input device associated with the wearable advertising display system. Similarly, the wearable advertising display system may track information regarding onlooker interaction via devices associated with onlookers (e.g., an onlooker's mobile phone).

As shown at block 804, the wearable advertising display system communicates the advertising usage information to a network component, such as the advertising server 304 of FIG. 3, for example. In some embodiments, the wearable advertising display system may communicate advertising usage information to the network component as the information is tracked. In other embodiments, the wearable advertising display system may store advertising usage information as it is tracked and periodically communicate the stored advertising usage information to the network component. In embodiments, the wearable advertising display system and/or network component may associate various pieces of advertising usage information together. For instance, the information regarding when and where particular advertising content was presented may be associated with an identification of that advertising content.

The network component stores the advertising usage information received from the wearable advertising display system, as shown at block 806. The stored advertising usage information may be used by the network component or another associated component to determining billing for the advertising services provided by the wearable advertising display systems. In some embodiments of the present invention, this may comprise determining compensation amounts based on the advertising usage information. In other embodiments, this may comprise verifying that a specified advertising service has been provided. For instance, a wearer may be instructed and compensated to present specified advertising content at a specified location, and at a specified time. The tracked advertising usage information may be used to verify that the specified advertising content was presented at the specified location and time.

Figure 9:
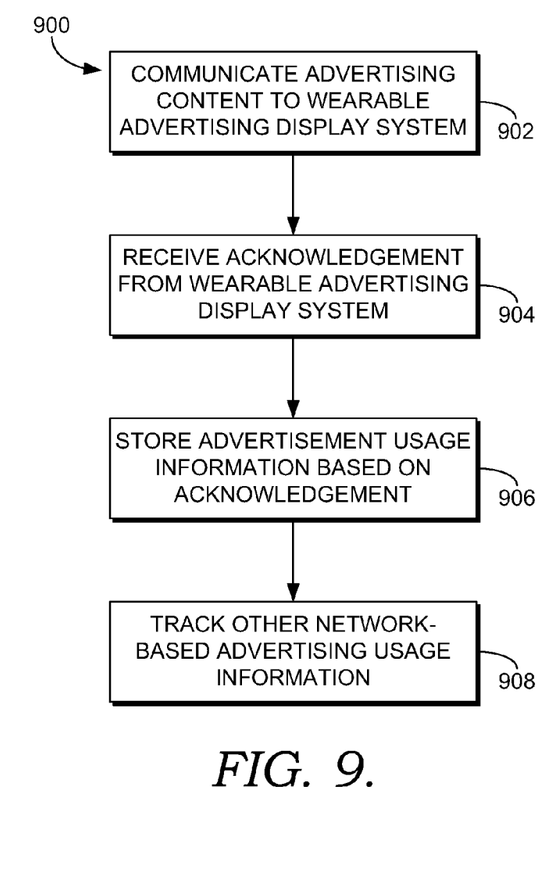
FIG. 9 is a flow diagram showing an exemplary method for tracking advertising usage information for billing advertising services provided by a wearable advertising display system in accordance with another embodiment of the present invention.

Turning now to FIG. 9, a flow diagram is provided illustrating a method 900 for tracking advertising usage information at a network component for billing advertising services provided by a wearable advertising display system. As shown at block 902, advertising content is communicated to the wearable advertising display system. For example, an advertising server, such as the advertising server 304 of FIG. 3, may select advertising content and communicate the advertising content to the wearable advertising display system.

A network component, such as the advertising server 304 of FIG. 3, receives an acknowledgement from the wearable advertising display system that the advertising content was received and displayed, as shown at block 904. The network component may store advertising usage information based on the acknowledgement, including what advertising content was communicated and when the advertising content was communicated to the wearable advertising display system, as shown at block 906.

In some embodiments, the network component may also track other network-based advertising usage information, as shown at block 908. For instance, in an embodiment, the network component may be able to access location information associated with the wearable advertising display system to determine the location of the wearable advertising display system when advertising content was communicated and/or presented. In embodiments, the network component may also be able to determine the presence of onlookers within the vicinity of the wearable advertising display system. The network component may be able to determine the location of the wearable advertising display system and the location of devices associated with onlookers (e.g., onlookers' mobile phones) to determine that onlookers are within proximity of the wearable device display system. The network component may do so, for example, by recognizing the onlooker devices and wearable display system are within the same Wi-Fi zone or by accessing GPS location information for the onlooker devices and wearable display system. In further embodiments, the network component may also be able to track onlooker interaction with the wearable advertising display system.

The advertising usage information tracked by the network component may be used for billing advertising services provided by the wearable advertising system. Similar to that discussed above for the method 800 and with reference to FIG. 8, the advertising usage information may be used to determine compensation for advertising services and/or to verify that specified advertising was provided by the wearable advertising display system.

CONCLUSION

As can be seen, embodiments of the present invention relate to a dynamic wearable display system for advertising. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-storage media having computer-useable instructions embodied thereon for performing, when executed by one or more processors, a method for presenting coordinated advertising content via two or more wearable advertising display systems, the method comprising:

receiving an indication from at least one of the display systems that the at least one of the display systems detected the presence of one or more other display systems within a wireless personal area network coverage area of the at least one of the display systems;

determining that the two or more wearable advertising display systems ("display systems") are located within proximity of each other;

determining that the display systems are situated to work together to each present a different portion of the coordinated advertising content to an onlooker, the display systems each integrated with an article of clothing and visible to onlookers, wherein the display systems communicate between each other and the display systems communicate with an advertising server to provide coordinated advertising content;

selecting coordinated advertising content for the display systems, wherein the coordinated advertising content comprises any combination of media content, including still images, text, video, and audio content; and communicating different portions of the coordinated advertising content to the display systems, wherein communicating the coordinated advertising content to the display systems comprises communicating the coordinated advertising content to one of the display systems, wherein the one of the display systems communicates at least a portion of the coordinated advertising content to the other display systems, and wherein each of the display systems receives a different portion of the coordinated advertising content;

wherein each of the display systems presents the different portion in conjunction with the other display systems, and the display systems collectively present the entire coordinated advertising content to the onlooker.

2. The computer-storage media of claim 1, wherein determining that the display systems are located within proximity of each other comprises determining a location of each of the display systems.

3. The computer-storage media of claim 1, wherein determining that the display systems are located within proximity of each other comprises receiving a manual indication from at least one of the display systems that the display systems are located within proximity of each other.

4. The computer-storage media of claim 1, wherein selecting coordinated advertising content for the display systems comprises at least one of: making a random selection of coordinated advertising content; receiving a manual selection of coordinated advertising content from at least one of the display systems; selecting coordinated advertising content based on a location of the display systems; and selecting coordinated advertising content based on a user profile associated with at least one of the display systems.

5. The computer-storage media of claim 1, wherein selecting coordinated advertising content for the display systems comprises selecting the coordinated advertising content based on the number of display systems located within proximity of each other.

6. The computer-storage media of claim 1, wherein communicating the coordinated advertising content to the display systems comprises streaming the coordinated advertising content to the display systems.

7. The computer-storage media of claim 1, wherein communicating the coordinated advertising content to the display systems comprises communicating at least a portion of the coordinated advertising content to each of the display systems.

8. A system for presenting coordinated advertising content via two or more wearable advertising display systems, the system comprising:

an advertising server storing coordinated advertising content that includes an advertising message, wherein the advertising server is configured to select coordinated advertising content, wherein the coordinated advertising content comprises any combination of media content, including still images, text, video, and audio content, wherein the advertising server is configured to receive an indication from at least one of the display systems that the display systems are located within proximity of each other, and wherein the advertising server is configured to communicate the coordinated advertising content to one of the display systems; and two or more wearable advertising display systems ("display systems") that are each integrated with an article of clothing and visible to onlookers, and A) at least one of the display systems is configured to communicate with the advertising server to receive different portions of the advertising message and communicate at least a portion of the coordinated advertising content to one or more of the other display systems, B) wherein each display system receives a different portion of the advertising message, and C) one or more of the display systems is configured to detect the presence of one or more of the other display systems within a wireless personal area network coverage area and determine when the display systems are situated near enough to each other to work together to present the different portions of the advertising message to an onlooker in conjunction, D) wherein the different portions are coordinated and each display system presents a different portion to collectively provide the entire advertising message to the onlooker.

9. The system of claim 8, wherein receiving a portion of the advertising message comprises receiving the coordinated advertising content from an advertising server over a long-range wireless interface.

10. The system of claim 8, wherein the advertising server is configured to determine that the display systems are located within proximity of each other by receiving an indication from at least one of the display systems that the display systems are located within proximity of each other.

11. The system of claim 10, wherein at least one of the display systems is configured to determine a proximity of another of the display systems.

* * * * *